3,043,787
PRINTING INK COMPOSITION CONTAINING POLYPROPYLENE AND PROCESS FOR PRODUCING SAME

Alberto Bonvicini and Luciano Lucchetti, Terni, Italy, assignors to Montecatini Società Generale per l'Industria Mineraria e Chimica, Milan, Italy, a corporation of Italy
No Drawing. Filed May 25, 1959, Ser. No. 815,310
Claims priority, application Italy May 30, 1958
7 Claims. (Cl. 260—4)

This invention relates to an improved writing and printing ink composition with special applicability to printing on articles formed from synthetic resins and particularly from polymeric olefins.

Until recently, one of the drawbacks in the use of articles formed from synthetic resins was the lack of printing inks which would adhere tenaciously to the resins. This lack of adhesion of prior art printing inks is due to the substantially non-porous macroscopic structure of the resins. In the printing of polymeric olefins, this lack of adhesion is even more enhanced by the lack of functional groups which are capable of bonding substances chemically different from the polymer.

It has recently been disclosed that satisfactory printing inks can be made utilizing as the essential component, and primary fixative for the pigment, a linear, regular, head-to-tail, low molecular weight polymer of an alpha olefin having the Natta atactic structure, and in particular such polymers of propylene or butene or mixtures thereof in any proportion.

These inks must be made by heating the solvent containing the amorphous low molecular weight poly (alpha) olefin at the boiling point of the solvent for about 30 minutes in order to dissolve the polymer completely. Naturally, boiling solvents in many cases present serious hazards with respect to toxicity and flammability, and therefore it would be extremely desirable to eliminate these costly and dangerous steps.

It is an object of this invention to provide a new ink which can be made safely and when printed on an article formed from a polymeric olefin adheres permanently to the article.

Another object is to provide a process for making a writing and printing ink which is substantially devoid of hazardous operations.

Other objects and advantages of this invention will become apparent upon further study of the description and the appended claims.

These objects are accomplished by utilizing a stereoblock polymeric alpha olefin as the essential component of the printing ink. These stereoblock polymeric alpha olefins are analogous to block polymers, but instead of containing distinct chain portions or sections made up of units derived from distinctly chemically different monomers within the same macromolecule, the stereoblock polymers of said alpha-olefins $CH_2=CHR$ consist of macromolecules the main chain of which is made up of inseparable distinct portions or sections formed of units derived from the same monomer but which have distinctly different steric structures (atactic and isotactic). These polymers are derived from alpha olefins $CH_2=CH-R$, wherein R is an alkyl or aryl radical containing from 1-16 carbon atoms.

Processes for producing these polymers were first disclosed by Natta et al. For example, Natta et al. have disclosed, in their pending application Ser. No. 550,164, a process for the stereospecific polymerization of the higher alpha olefins $CH_2=CHR$, which results in a polymerizate generally comprising the stereoblock polymers. Such a process consists in polymerizing propylene, for example, in contact with a catalyst prepared by (a) starting with a highly crystalline halide of a transition metal in which the metal has a valency not higher than 3, e.g. $TiCl_3$, and (b) mixing said halide with an alkyl compound of a metal of Group 2 or 3 of the Mendeleeff Periodic Table, e.g. triethyl aluminum, to obtain a polymerizate consisting prevailingly (over 60%) of isotactic macromolecules as defined by Natta et al., and which polymerizate usually also contains some amorphous non-crystallizable, linear, regular, head-to-tail macromolecules and some stereoblock macromolecules comprising the inseparable atactic and isotactic chain portions and which exhibit relatively low crystallinity. By selective solvent leaching techniques, the stereoblock polymer is obtained essentially free of atactic and isotactic macromolecules.

The intrinsic viscosity of these stereoblocks is variable, generally being from 0.4 to 1. The degree of crystallinity exhibited by these stereoblocks is also variable, according to the monomer and/or the percentage of isotactic lengths. Generally, these polymers show up to 50% crystallinity at the X-rays at room temperature.

The amount of the stereoblock poly(alpha) olefin to be used in preparing the ink is not rigidly fixed and may be varied. It is preferable, however, that the amount used should not be less than about 5% by weight based on the total solids weight of the composition. The basic writing and printing ink composition of this invention may be comprised of the coloring matter such as a dye or pigment, the stereoblock polymer and a suitable solvent or diluent.

For certain applications and for certain equipment it is necessary to control the viscosity of the printing ink solution and therefore it is preferable to add to the basic composition a viscosity regulator which can be a paraffin base wax or tragacanth or natural rubber or a synthetic rubber such as butadiene-styrene, butadiene-acrylonitrile, "neoprene" (2-chloro-butadiene), polyisoprene, polyprethane gums, silicon gums and the like. Obviously, the amount added is controlled by the desired viscosity.

In addition, it is preferable to add to the composition one or more tackifying resinous materials which improve the initial adhesion of the ink to the synthetic resin surface. Examples of these resinous materials are: coumarone-indene resins, phenol-modified coumarone-indene resins, natural resins, zinc salts of resin acids, phenol-formaldehyde resins, glycerolphthalic (alkyd) resins, etc. The amount added can be varied, but is usually from 3–5%.

In order to modify the adhesive qualities of the stereoblock polymers employed in the present invention, they are preferably subjected to chlorination or sulfonation or sulfochlorination treatment. The extent of these treatments may vary considerably: however, in general it is preferred to maintain a chlorine content of 20–46% by weight and/or a sulfur content of 0.2 to 3.0% by weight.

It is possible to use mixtures of stereoblock polymers containing diverse modified polymers, and/or unmodified stereoblock polymers. As the basic component of the writing and printing inks of this invention, a polypropylene modified as described above is preferred.

A great advantage of this invention is that these chemically-modified polymers can be solubilized at room temperature without the serious hazards that accompany operations employing boiling solvents.

A great variety of solvents can be used to dissolve these chemically modified polymers at room temperature. Such solvents are: $CCl_4$, tetrachloroethylene, methylethylketone, petrol fractions boiling at 170–200° C., tetrahydronaphthalene, n-heptane, octane, nonane, decane, and similar organic compounds.

In general, the process for making the compositions is to simply add the desired constituents of the composition to a solvent at room temperature. The solvent selected is determined by the desired degree of adhesion rate, of evaporation and viscosity and generally varies between 95% and 30% of the total composition. The resulting writing and printing ink is a stable solution which shows no tendency to separate into phases even when it is allowed to stand for long periods of time.

Printing of the solution on a surface of a shaped article does not require any particular precautions. The ink can be applied to the article by any of the known methods of printing, engraving, lithography, etc. After the ink has been applied, the article can be air-dried. The amount of dye or pigment incorporated in the composition can be varied, depending on the particular dye or pigment selected and color intensity desired.

The printing ink of this invention is especially adapted for application to the surface of articles formed from resinous materials and particularly to films of cellulose acetate, polyesters, chlorinated vinyl polymers and poly olefins. It is also useful for printing other non-porous surfaces as metal and glass and, moreover, finds utility on porous surfaces such as fabrics, wood and paper. When the articles are printed with this novel printing ink, they are then subjected to a standard test to determine adhesiveness. This consists in applying a strip of adhesive tape to a printed surface and rapidly stripping it off in a vertical direction. The printed articles manufactured utilizing this invention show excellent adhesion of the print, and furthermore there is no damage to the print as a result of the test.

Printed fabrics manufactured by utilizing this invention exhibit an outstanding resistance to wear tests of continual washing and rubbing.

The following examples are submitted to assist the user of this invention, and are not intended to be limitative of the appended claims.

Compositions were made, with very satisfactory results, using the following polymers, both modified and unmodified. Intrinsic viscosity is measured in tetralin at 135° C.

(1) *Stereoblock polymers.*—(a) Stereoblock polypropylene, showing 35% crystallinity at the X-rays at room temperature, with an intrinsic viscosity of 0.65, obtained as the heptane extractable fraction of the crude, linear, regularly head-to-tail polymerizate prepared by polymerizing propylene in contact with a stereospecific polymerization catalyst, according to Natta et al.

(b) Stereoblock polypropylene, showing 30% crystallinity at the X-rays at room temperature, with an intrinsic viscosity of 0.63, obtained as the trichloroethylene extractable fraction of the crude, linear, regularly head-to-tail polymerizate prepared by polymerizing propylene in contact with a stereospecific catalyst according to Natta et al.

(2) Polymers modified according to the present invention. (The stereoblock polymers mentioned under (1) were dissolved in $CCl_4$ or an equivalent solvent, at 70° C. and then subjected to the action of gaseous chlorine for times varying from 2 to 10 hours. From the solutions, the chlorinated polypropylene was precipitated with methyl alcohol or another solvent. For a sulfo-chlorination reaction, the polymer in carbon tetrachloride solution at 70° C. is subjected to the action of chlorine and sulfur dioxide at the same time.)

The polymers obtained from various polypropylenes and employed according to the present invention have the following characteristics:

| Run | Chlorination Time (Hours) | Cl Content of Polymer, percent by weight | Intrinsic Viscosity of Chlorinated Polymer |
|---|---|---|---|
| c | 2 | 26.78 | 0.8 |
| d | 3 | 29.12 | 0.41 |
| e | 4 | 33.6 | 0.71 |
| f | 6 | 40.17 | 0.49 |
| g | 6 | 40.17 | 0.5 |
| h | 10 | 45.06 | 0.68 |
| i [1] | 3 | 23.1 | 0.61 |

[1] This material was simultaneously sulfonated to the extent of 1.12% sulfur.

Typical ink compositions prepared according to the present invention are as follows:

(1) 10 parts polymers mentioned under (a) and (b)
5 parts chlorinated paraffin wax (viscosity regulator)
80 parts tetrachloroethylene
5 parts aluminum powder (2) 15 parts polymers mentioned under (c)
80 parts tetrachloroethylene
5 parts cadmium green (3) 20 parts polymers mentioned under (d)
5 parts chlorinated paraffin wax (viscosity regulator)
70 parts petroleum fractions boiling at 180–200° C.
5 parts carbon black (4) 10 parts polymers mentioned under (e)
80 parts tetrachloroethylene
5 parts tragacanth gum (viscosity regulator)
5 parts aluminum powder (5) 40 parts polymers mentioned under (f), (g), (h), and (i)
55 parts methylethylketone
5 parts violet cibacet B (6) In Examples 1, 3, and 5, the viscosity regulator can be a natural rubber or a synthetic rubber, such as butadiene-styrene, butadiene-acrylonitrile, neoprene, isoprene, polyurethane gums, silicone gums and the like. It is understood that the primary function of these materials is to regulate the viscosity of the solution.

(7) In Examples 1–6, said compositions are modified by the inclusion of about 3–5% of a substance capable of increasing the initial adhesiveness of the ink, said substance being a material such as the coumarone-indene resins, phenol-formaldehyde resins, acrylonitrile-butadiene copolymeric resins, etc.

(8) In Examples 1–7, other poly(alpha) olefin stereoblocks such as butene-1, styrene, octene-1, duodecene-1, and hexadecene-1 in replacement of propylene yield satisfactory printing inks. These stereoblocks show up to 50% crystallinity at the X-rays at room temperature.

It is believed that the printing inks produced by this invention provide a stronger and more durable bond to the printed surface than is possible by prior art printing inks. It has been found that same inks are particularly suitable as writing inks, especially for fountain and ball-point pens.

It is understood that the inventors intend to claim, as a part of their invention, any variation, substitution and changes that lie within the scope of the invention and the hereinafter appended claims and intend to include within the scope of said claims such changes as may be apparent to those skilled in the art in the practice of the principles of this invention and within the scope as set forth in the hereinabove-stated specification.

What we claim is:
1. A writing and printing ink composition consisting of a stable solution the essential components of which are (1) an agent selected from the group consisting of dyes and pigments, (2) at least 5% by weight, based on the total solids weight, of a fixative selected from the group consisting of (a) partially crystalline stereoblock polymers of propylene, said stereoblock polymer being made up of macromolecules comprising inseparable isotactic and atactic chain portions and exhibiting up to 50% crystallinity at the X-rays, (b) chlorinated derivatives of said stereoblock propylene polymers containing from about 20% to about 45% combined chlorine, and (c) chlorosulfonated derivatives of said propylene stereoblock polymers containing from about 20% to about 45% of total combined chlorine and from about 0.2% to about 3% of combined sulfur, and (3) a solvent in which said essential components are soluble.

2. A writing and printing ink composition as described in claim 1, further characterized in that it also contains a viscosity regulator selected from the group consisting of paraffin base wax, tragacanth, natural and synthetic rubber.

3. A writing and printing ink composition as described in claim 1, further characterized in that it also contains 3% to 5% by weight on the total solids weight of a tackifying resinous material selected from the group consisting of coumarone-indene resins, phenol-modified coumarone-indene resins, natural resins, zinc salts of resin acids, phenol formaldehyde resins and glycerolphthalic resins.

4. A writing and printing ink composition as described in claim 1, further characterized in that it also contains a viscosity regulator selected from the group consisting of paraffin base wax, tragacanth, natural and synthetic rubber, and from 3% to 5% by weight based on the total solids weight of a tackifying resinous material selected from the group consisting of coumarone-indene resins, phenol-modified coumarone-indene resins, natural resins, zinc salts of resin acids, phenol formaldehyde resins and glycerolphthalic resins.

5. A writing and printing ink composition as described in claim 1, characterized in that the fixative is a heptane-extractable stereoblock polymer of propylene having an intrinsic viscosity of 0.4 to 1.0 determined in tetralin at 135° C., and which exhibits about 35% crystallinity at the X-rays.

6. A writing and printing ink composition as described in claim 1, characterized in that the fixative is a trichlorethylene-extractable stereoblock polymer of propylene having an intrinsic viscosity of 0.4 to 1.0 determined in tetralin at 135° C., and which exhibits about 30% crystallinity at the X-rays.

7. A process for making a writing and printing ink in the form of a stable solution comprising, as essential dissolved components, (1) an agent selected from the group consisting of dyes and pigments and (2) at least 5% by weight, based on total solids weight, of a fixative selected from the group consisting of (a) partially crystalline stereoblock polymers of propylene, said stereoblock propylene polymers being made up of macromolecules comprising distinct, inseparable atactic and isotactic chain sections and exhibiting up to 50% crystallinity at the X-rays, (b) chlorinated derivatives of said stereoblock propylene polymers containing from about 20% to 45% of combined chlorine, and (c) chlorosulfonated derivatives of said stereoblock propylene polymers containing from about 20% to about 45% of total combined chlorine and from about 0.2% to about 3.0% of combined sulfur, which process comprises adding the essential components to a solvent therefor at room temperature, and agitating the mass at room temperature until a stable solution is obtained.

References Cited in the file of this patent
UNITED STATES PATENTS

| 2,558,053 | Lee | June 26, 1951 |
| 2,612,480 | May | Sept. 30, 1952 |
| 2,618,574 | Pavlic | Nov. 18, 1952 |

OTHER REFERENCES

Condensed Chem. Dictionary, 5th Edition (1956), pub. by Reinhold Pub. Corp. of New York, page 801.

UNITED STATES PATENT OFFICE
CERTIFICATE OF CORRECTION

Patent No. 3,043,787            July 10, 1962

Alberto Bonvicini et al.

It is hereby certified that error appears in the above numbered patent requiring correction and that the said Letters Patent should read as corrected below.

Column 2, line 46, for "polyprethane" read -- polyurethane --.

Signed and sealed this 26th day of March 1963.

(SEAL)
Attest:

ESTON G. JOHNSON
Attesting Officer

DAVID L. LADD
Commissioner of Patents